(12) United States Patent
Su et al.

(10) Patent No.: US 7,859,770 B2
(45) Date of Patent: Dec. 28, 2010

(54) FIXED-FOCUS LENS

(75) Inventors: Yuan-Hung Su, Hsinchu (TW); Chien-Hsiung Tseng, Hsinchu (TW); Yi-Hao Kang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 12/702,003

(22) Filed: Feb. 8, 2010

(65) Prior Publication Data
US 2010/0265596 A1 Oct. 21, 2010

(30) Foreign Application Priority Data
Apr. 15, 2009 (TW) .............................. 98112555 A

(51) Int. Cl.
*G02B 13/04* (2006.01)
*G02B 13/18* (2006.01)

(52) U.S. Cl. ...................... 359/749; 359/751; 359/753; 359/708

(58) Field of Classification Search ................. 359/708, 359/749–753
See application file for complete search history.

(56) References Cited

U.S. PATENT DOCUMENTS

| | | | |
|---|---|---|---|
| 6,542,316 B2 | 4/2003 | Yoneyama | |
| 6,560,041 B2 | 5/2003 | Ikeda et al. | |
| 6,621,645 B2 | 9/2003 | Sato | |
| 6,999,247 B2 | 2/2006 | Kim | |
| 7,123,426 B2 | 10/2006 | Lu et al. | |
| 7,126,767 B2 | 10/2006 | Lu | |
| 7,173,777 B1 | 2/2007 | Lu et al. | |
| 7,180,686 B2 * | 2/2007 | Kato | 359/753 |
| 7,184,219 B2 | 2/2007 | Kobayashi | |
| 2009/0109551 A1 * | 4/2009 | Hatada | 359/753 |

* cited by examiner

*Primary Examiner*—Scott J Sugarman
(74) *Attorney, Agent, or Firm*—J.C. Patents

(57) ABSTRACT

A fixed-focus lens including a first lens group and a second lens group is provided. The first lens group is disposed between a magnified side and a reduced side and includes a first lens and a second lens arranged in sequence from the magnified side to the reduced side. The refractive powers of both the first lens and the second lens are negative, and the first lens is an aspheric lens. The second lens group is disposed between the first lens group and the reduced side and includes a third lens, a fourth lens, a fifth lens, a sixth lens, a seventh lens, an eighth lens, and a ninth lens arranged in sequence from the magnified side to the reduced side. The refractive powers of the seven lenses from the third lens to the ninth lens are respectively positive, negative, positive, negative, positive, negative, and positive in sequence.

19 Claims, 9 Drawing Sheets

FIXED-FOCUS LENS

CROSS-REFERENCE TO RELATED APPLICATION

This application claims the priority benefit of Taiwan application serial no. 98112555, filed on Apr. 15, 2009. The entirety of the above-mentioned patent application is hereby incorporated by reference herein and made a part of this specification.

BACKGROUND OF THE INVENTION

1. Field of the Invention

The invention generally relates to a lens, and more particularly, to a fixed-focus lens.

2. Description of Related Art

Along with the development of display technology, a new generation of displays, such as liquid crystal display (LCD), plasma display panel (PDP) and projection apparatus, gradually substitute traditional cathode ray tub (CRT), wherein the flat displays such as LCD and PDP occupy a larger portion in the household appliances market due to the thinner figure thereof. On the other hand, the projection apparatus keeps occupy a considerable portion in the market due to the capability of providing a mega-size frame (larger than 52 inch, for example) with a lower cost. The above-mentioned mega-size frame is suitable for many viewers to watch, and it is valuable for holding conference, report presentation or teaching information demo, which becomes one of major reasons for the projection apparatus to be unsubstitutional as well. In recent years, the projection apparatus even plays an indispensable role to establish a home theater.

In a projection apparatus, the image on a light valve is a small but dedicate frame, wherein the light valve is, for example, liquid-crystal-on-silicon panel (LCOS panel) or digital micro-mirror device (DMD). In order to project the small frame of the light valve on a screen to obtain a large frame, a projection lens is required. The projection lens makes the image beam from the light valve projected on the screen, wherein to make the projection apparatus able to produce a larger projected image frame in a shorter distance, a fixed-focus lens with a larger field of view (FOV), i.e., a wide-angle lens, is needed.

During designing a wide-angle lens, a designer must puzzle the aberration issue. In order to reduce aberration of the wide-angle lens, an aspheric lens may be employed to correct the aberration as the regular solution. However, the cost and the production difficulty of the aspheric lens are higher. The aspheric lens also makes the assembly of the lens more difficult. The more the employed aspheric lenses, the higher the fabrication difficulty and the cost are. If a designer wishes to employ a less number of the aspheric lenses and keep the aberration within an acceptable range, the length of the conventional wide-angle lens may be increased or more lenses are required to correct the aberration in the prior art. A larger total length of the wide-angle lens results in a larger volume of the projection apparatus and an expensive cost.

SUMMARY OF THE INVENTION

Accordingly, the invention is directed to a fixed-focus lens, which is able to provide good imaging quality, and meanwhile reduce the cost of the optical components, the fabrication difficulty of the lenses and the volume of the fixed-focus lens.

Other advantages of the invention should be further indicated by the disclosures of the invention, and omitted herein for simplicity.

To achieve one of, a part of or all of the above-mentioned advantages, or to achieve other advantages, an embodiment of the invention provides a fixed-focus lens. The fixed-focus lens includes a first lens group and a second lens group. The first lens group is disposed between a magnified side and a reduced side and includes a first lens and a second lens arranged in sequence from the magnified side to the reduced side, wherein the refractive powers of both the first lens and the second lens are negative, and the first lens is an aspheric lens. The second lens group is disposed between the first lens group and the reduced side and includes a third lens, a fourth lens, a fifth lens, a sixth lens, a seventh lens, an eighth lens, and a ninth lens arranged in sequence from the magnified side to the reduced side, wherein the refractive powers of the third lens, the fourth lens, the fifth lens, the sixth lens, the seventh lens, the eighth lens, and the ninth lens are respectively positive, negative, positive, negative, positive, negative, and positive in sequence. The effective focal length (EFL) of the fixed-focus lens is F, the image height at the reduced side is H, and F/H>0.627.

In the fixed-focus lens of the embodiment of the invention, the distortion, the astigmatism and the field curvature of imaging may be reduced through a combinational disposition of the aspheric lens and the spherical lens in the first lens group. Meanwhile, the spherical aberration and the coma may be reduced by alternately arranging at least a part of the spherical lenses in the second lens group so as to make the positive refractive powers and the negative refractive powers thereof alternately arranged. In this way, the fixed-focus lens of the embodiment of the invention is able to produce good imaging quality. Further, since the fixed-focus lens of the embodiment of the invention employs a less number of aspheric lenses (for example, usually a piece only), the fixed-focus lens is advantageous in having good imaging quality, saving the cost of the optical components and reducing the fabrication difficulty of the lenses. Moreover, the fixed-focus lens of the embodiment of the invention employs less number of the lenses, such that the volume of the fixed-focus lens is reduced. In addition, since the fixed-focus lens is designed under the condition of F/H>0.627, so that a wider FOV is achieved without degrading the imaging quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The First Embodiment

Figure 1:
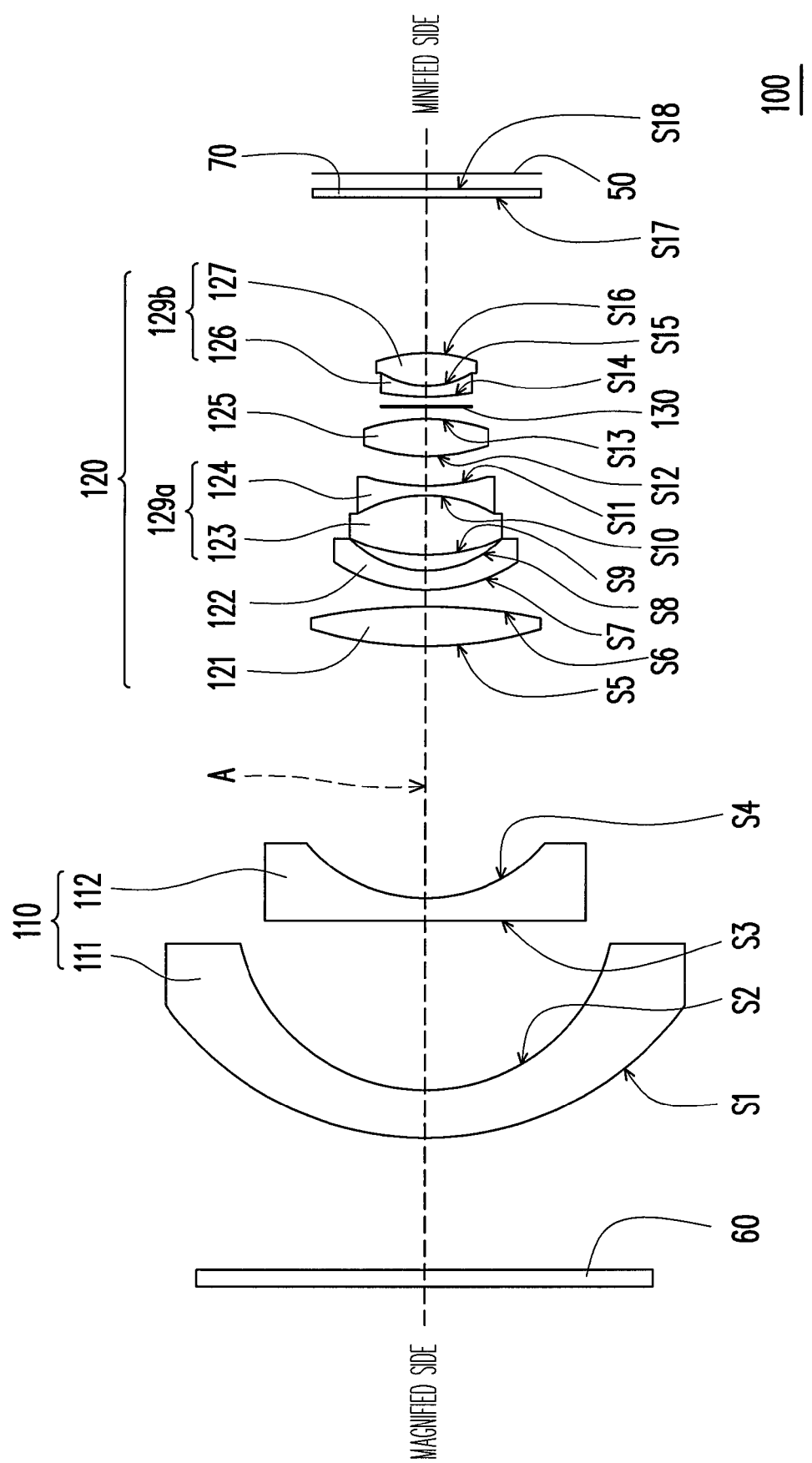
FIG. 1 is a structure diagram of a fixed-focus lens according to the first embodiment of the invention.

Referring to FIG. 1, a fixed-focus lens 100 of the embodiment includes a first lens group 110 and a second lens group 120. The first lens group 110 is disposed between a magnified side and a reduced side and includes a first lens 111 and a second lens 112 arranged in sequence from the magnified side to the reduced side. The refractive powers of both the first lens 111 and the second lens 112 are negative, the first lens 111 is an aspheric lens and the second lens 112 is a spherical lens. In the embodiment, the first lens 111 is, for example, a convex-concave lens with a convex surface facing the magnified side, and the second lens 112 is, for example, a plane-concave lens with a plane surface facing the magnified side.

The second lens group 120 is disposed between the first lens group 110 and the reduced side and includes a third lens 121, a fourth lens 122, a fifth lens 123, a sixth lens 124, a seventh lens 125, an eighth lens 126, and a ninth lens 127 arranged in sequence from the magnified side to the reduced side, wherein the refractive powers of the third lens 121, the fourth lens 122, the fifth lens 123, the sixth lens 124, the seventh lens 125, the eighth lens 126, and the ninth lens 127 are respectively positive, negative, positive, negative, positive, negative, and positive in sequence. Each of the third lens 121, the fourth lens 122, the fifth lens 123, the sixth lens 124, the seventh lens 125, the eighth lens 126, and the ninth lens 127 is, for example, respectively a spherical lens. In the embodiment, the third lens 121 is, for example, a double-convex lens. The fourth lens 122 is, for example, a convex-concave lens with a convex surface facing the magnified side. The fifth lens 123 is, for example, a double-convex lens. The sixth lens 124 is, for example, a double-concave lens. The seventh lens 125 is, for example, a double-convex lens. The eighth lens 126 is, for example, a convex-concave lens with a convex surface facing the magnified side. The ninth lens 127 is, for example, a double-convex lens.

In the embodiment, the fifth lens 123 and the sixth lens 124 together form a first double cemented lens 129a, and the eighth lens 126 and the ninth lens 127 together form a second double cemented lens 129b. In this embodiment, the fixed-focus lens 100 further includes an aperture stop 130 disposed between the seventh lens 125 and the eighth lens 128.

The fixed-focus lens 100 of the embodiment is adapted to make an object at the reduced side imaged at the magnified side. Specially, an image processing device 50, for example, a liquid-crystal-on-silicon panel (LCOS panel) or a digital micro-mirror device (DMD) or other appropriate light valves, is disposed at the reduced side, while a screen 60 is disposed at the magnified side. The fixed-focus lens 100 is adapted to image the image frame produced by the image processing device 50 on the screen 60. Besides, a cover glass 70 is disposed between the ninth lens 127 and the image processing device 50 for the purpose of protecting the image processing device 50.

In the fixed-focus lens 100 of the embodiment, the distortion, the astigmatism and the field curvature of optical imaging may be reduced through a combinational disposition of the aspheric lens and the spherical lens in the first lens group 110. Meanwhile, the spherical aberration and the coma may be reduced by alternately arranging the spherical lenses (i.e., the seven lenses from the third lens 121 to the ninth lens 127) in the second lens group 120 so as to make the positive refractive powers and the negative refractive powers thereof alternately arranged. In this way, the fixed-focus lens 100 of the embodiment of the invention is able to produce good optical imaging quality. Further, since the fixed-focus lens 100 of the embodiment of the invention employs a less number of aspheric lenses (in the embodiment, a piece only), so that the fixed-focus lens 100 is advantageous in having good imaging quality, saving the cost of the optical components and reducing the fabrication difficulty. Moreover, the fixed-focus lens 100 of the embodiment of the invention employs less number of the lenses, such that the volume of the fixed-focus lens 100 is reduced.

In addition, F represents the EFL of the fixed-focus lens 100 and H represents the image height thereof at the reduced side. In the embodiment, the image height H is defined as the distance between the most farthest point away from the optical axis A within the image frame formed by the image processing device 50 at the reduced side on the active surface thereof and the optical axis A of the fixed lens 100, and the distance is measured along the direction perpendicular to the optical axis A. The fixed-focus lens 100 satisfies F/H>0.627 by design so as to achieve a wider FOV meanwhile to have good optical imaging quality. To better understand the above-mentioned design criteria, assuming the fixed-focus lens 100 satisfies F/H>1 by design, the corresponding result is that although good optical imaging quality remains, but the FOV is smaller (for example, less than 90°). On the other hand, assuming the fixed-focus lens 100 satisfies F/H<0.627 by design, the corresponding result is that although a wider FOV is achieved (for example, less than 115.5°), but the aberration is increased, which degrades the optical imaging quality and even is unacceptable by the user. In this regard, the fixed-focus lens 100 satisfying F/H>0.627 enables the fixed-focus lens 100 to have a wider FOV and better optical imaging quality.

In the embodiment, the positions of the first lens group 110, the fourth lens 122, the fifth lens 123, the sixth lens 124, the seventh lens 125, the eighth lens 126 and the ninth lens 127 relative to the fixed-focus lens 100 remain unchanged, and the third lens 121 is capable of moving relatively to the fixed-focus lens 100 for focusing. For example, when the user puts a projection apparatus employing the fixed-focus lens 100 in front of the screen 60, the image frame on the screen 60 produced by the projection may be out of focus since the focal length is not properly adjusted yet. At the time, the projected image frame on the screen 60 may be adjusted to be sharp by moving the third lens 121 for focusing only without changing the positions of the other lenses. Once the projection distance, i.e. the interval between the first lens 111 and the screen 60, gets changed, the above-mentioned image frame is out of focus again. At the time, the focusing may be accomplished by moving the third lens 121 only. In the fixed-focus lens 100 of the embodiment, the focusing may be accomplished by moving a lens only (i.e., the third lens 121), such that the mechanism for moving the third lens 121 to focus is simpler and employs less number of parts, which favors overall reducing the sensitivity of the fixed-focus lens 100 on tolerance. Adopting simpler and less mechanism parts helps to reduce the cost of the fixed-focus lens, and reducing the tolerance sensitivity of the overall fixed-focus lens makes the parameter of each lens have higher tolerance, which makes the fixed-focus lens 100 easily fabricated and gain higher production yield.

In the embodiment, the EFL of the first lens group 110 is F1, and the EFL of the second lens group 120 is F2. In order to make the fixed-focus lens 100 have better imaging quality, the fixed-focus lens 100 may satisfy 0.5<|F1/F|<1.7 and 1.9<|F2/F|<3.1.

In the following Tables 1, 2 and 3, the design data of a fixed-focus lens 100 are listed according to an embodiment. The invention is not limited to the embodiment. Anyone skilled in the art may refer to the invention and appropriately modify some of the parameters thereof, which still falls in the scope of the invention.

TABLE 1

| Surface | curvature radius (mm) | interval (mm) | refractive index | Abbe number | note |
|---|---|---|---|---|---|
| S1 | 28.67 | 5.99 | 1.49 | 57.4 | first lens |
| S2 | 13.1 | 17.96 | | | |
| S3 | infinity | 2.28 | 1.74 | 49.3 | second lens |
| S4 | 19.35 | variable | | | |
| S5 | 64.16 | 5.88 | 1.83 | 37.2 | third lens |
| S6 | −82.49 | variable | | | |
| S7 | 22.05 | 4.06 | 1.64 | 55.4 | fourth lens |
| S8 | 13.3 | 2.56 | | | |
| S9 | 22.53 | 7.97 | 1.66 | 50.9 | fifth lens |
| S10 | −15.37 | 1.2 | 1.8 | 39.6 | sixth lens |
| S11 | 44.66 | 3.75 | | | |
| S12 | 24.35 | 4.73 | 1.49 | 70.2 | seventh lens |
| S13 | −24.47 | 3.53 | | | |
| S14 | 63.65 | 1.2 | 1.83 | 37.2 | eighth lens |
| S15 | 11.61 | 4.38 | 1.5 | 81.5 | ninth lens |
| S16 | −27.61 | 22.28 | | | |
| S17 | infinity | 1.05 | 1.51 | 63.1 | cover glass |
| S18 | infinity | 1.11 | | | |

TABLE 2

| surface | projection distance (mm) | interval (mm) |
|---|---|---|
| SS4 | 500 | 32.6 |
| | 5000 | 32.19 |
| SS6 | 500 | 5.236 |
| | 5000 | 6.28 |

In Table 1, the interval means the distance between two adjacent surfaces along and on the optical axis A. For example, the interval of the surface S1 is defined as the distance between the surface S1 and the surface S2 along and on the optical axis A. The thickness, the refractive index and the Abbe number corresponding to each of the lenses in "note" column are given in a same row of Table 1. In addition, in Table 1, the surfaces S1 and S2 are the both surfaces of the first lens 111, the surfaces S3 and S4 are the both surfaces of the second lens 112, the surfaces S5 and S6 are the both surfaces of the third lens 121 and the surfaces S7 and S8 are the both surfaces of the fourth lens 122. The surface S9 is the surface facing the magnified side of the fifth lens 123, the surface S10 is the surface joining the fifth lens 123 and the sixth lens 124, the surface S11 is the surface facing the reduced side of the sixth lens 124, the surfaces S12 and S13 are the both surfaces of the seventh lens 125, the surface S14 is the surface facing the magnified side of the eighth lens 126, the surface S15 is the surface joining the eighth lens 126 and the ninth lens 127, and the surface S16 is the surface facing the reduced side of the ninth lens 127. The surfaces S17 and S18 are the both surfaces of the cover glass 70 for protecting the image processing device 50. The interval in the raw corresponding to the surface S18 is the one between the surface S18 and the image processing device 50.

In Table 2, the projection distance is defined as the distance between the screen 60 at the magnified side and the surface S1 of the first lens 111 along and on the optical axis A. For example, when the projection distance is 500 mm, the interval between the surface S4 and the surface S5 is 32.60 mm, and the interval between the surface S6 and the surface S7 is 5.236 mm, so that an image frame is imaged on the screen 60 sharply. Similarly, when the projection distance is 5000 mm, the interval between the surface S4 and the surface S5 is 32.19 mm, and the interval between the surface S6 and the surface S7 is 6.28 mm.

The parameter values of the curvature radius and interval corresponding to each surface are listed in Tables 1 and 2. The parameter values are omitted to describe.

The above-mentioned surfaces S1 and S2 are even power term aspheric surfaces. The above-mentioned surfaces S1 and S2 may be expressed by the following formula:

$$Z = \frac{cr^2}{1+\sqrt{1-(1+k)c^2r^2}} + A_2 r^2 + A_4 r^4 + A_6 r^6 + A_8 r^8 + A_{10} r^{10} + A_{12} r^{12} + A_{14} r^{14} + \ldots$$

In the formula, Z is a sag along the optical axis A, and c is the reciprocal of the radius of the osculating sphere, i.e. the reciprocal of the radius of curvature (e.g., the radius of curvatures of S1 and S2 in Table 1) close to the optical axis A. k is a conic coefficient. r is an aspheric height, i.e., the height from the center to the edge of the lens. $A_2, A_4, A_6, A_8, A_{10}, A_{12}, A_{14}$ ... are aspheric coefficients, and $A_2$ is 0 in this embodiment. The parameters of the surface S1 and S2 are listed in the following Table 3.

TABLE 3

| aspheric parameters | conic-surface coefficient | coefficient $A_4$ | coefficient $A_6$ | coefficient $A_8$ |
|---|---|---|---|---|
| S1 | −1.5608E−01 | −3.05365E−06 | −1.82586E−08 | 3.01891E−11 |
| S2 | −1.31666 | 4.35017E−05 | −5.85551E−08 | 1.31747E−10 |

| aspheric parameters | coefficient $A_{10}$ | coefficient $A_{12}$ | coefficient $A_{14}$ |
|---|---|---|---|
| S1 | −1.97643E−14 | 2.41156E−18 | 2.04719E−21 |
| S2 | −4.0683E−13 | 1.78007E−15 | −1.68252E−18 |

Figure 2A:
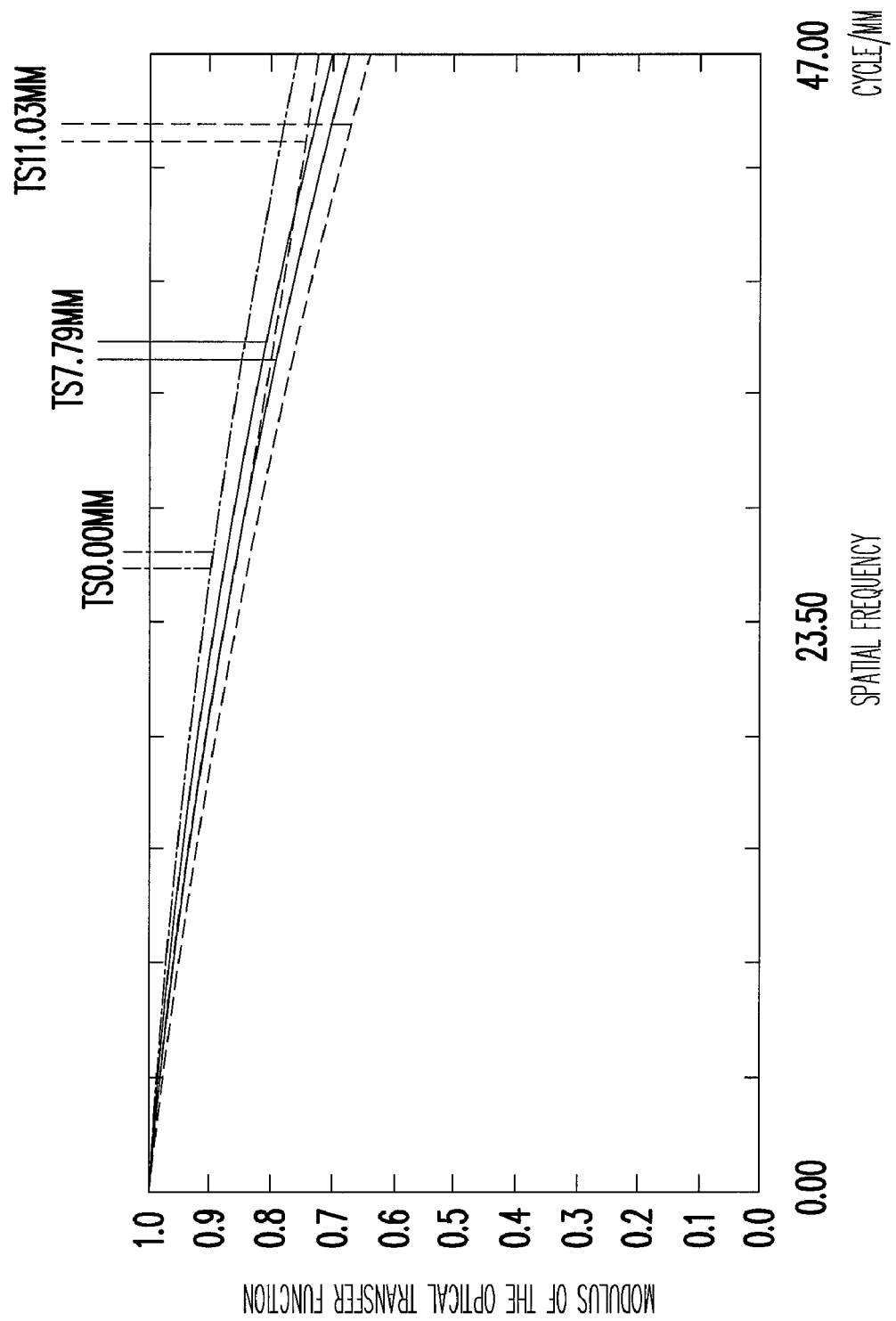
FIGS. 2A-2D are graph diagrams of imaging simulation results on the fixed-focus lens of FIG. 1.
Figure 2B:
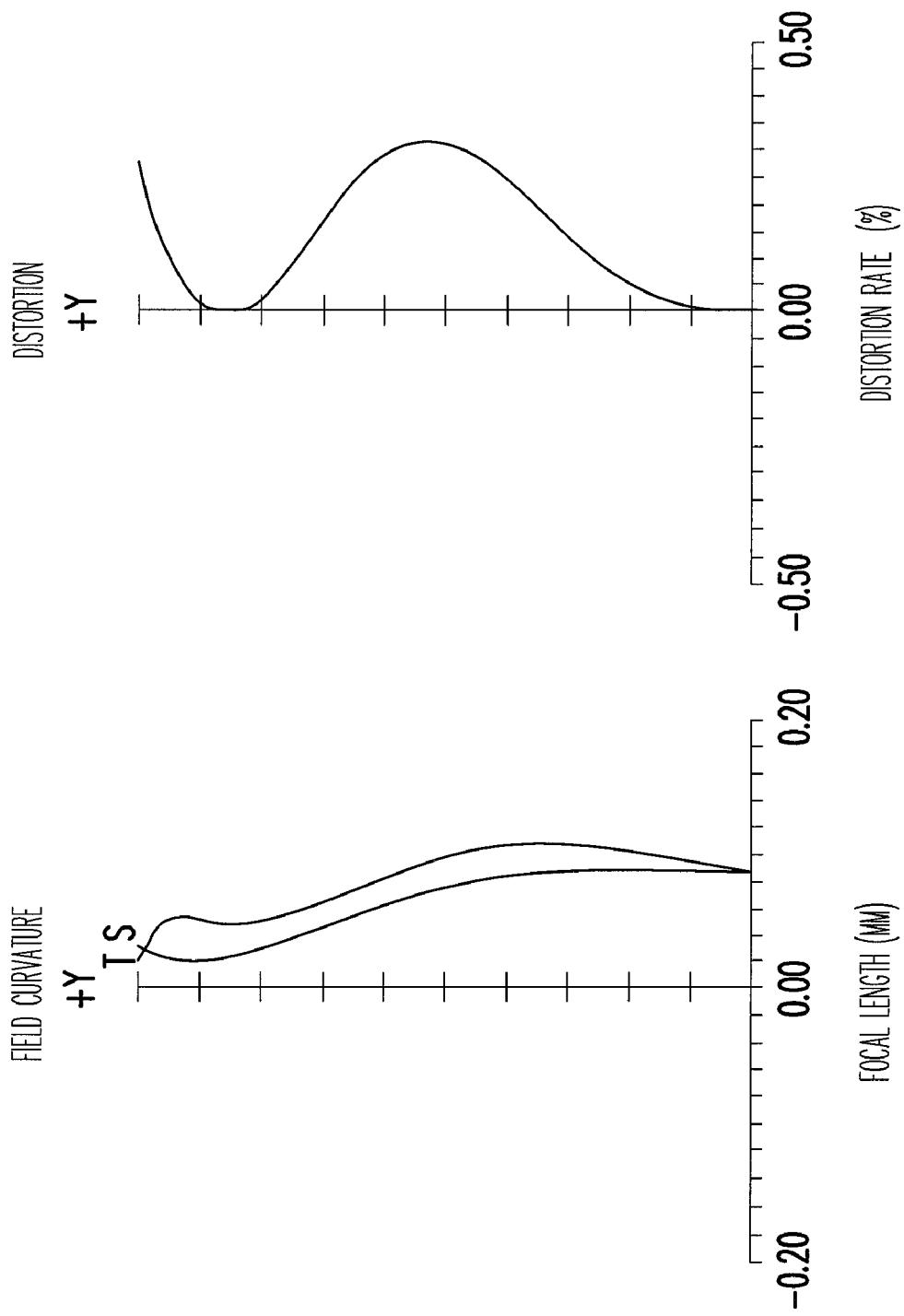
Figure 2C:
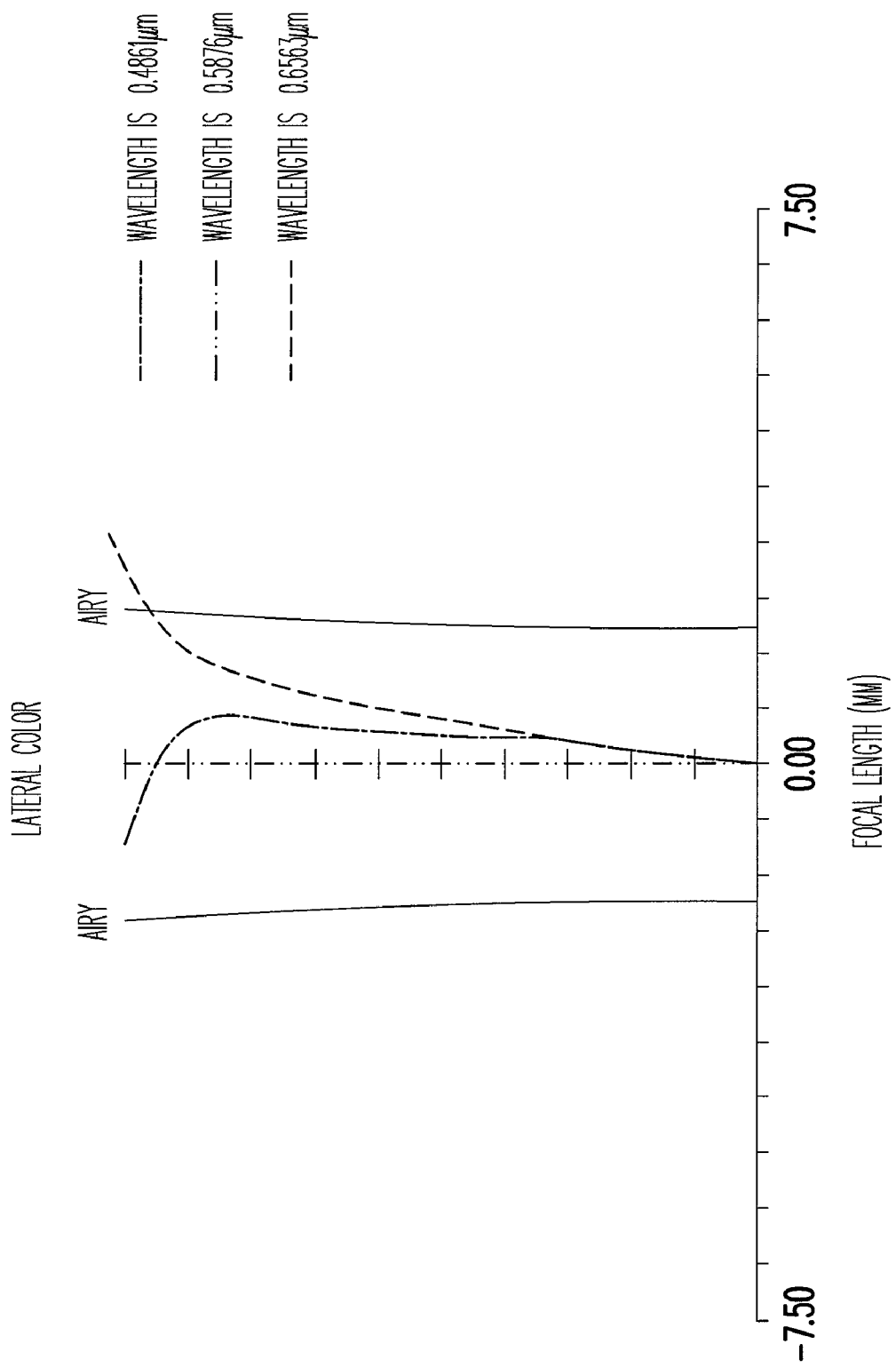
Figure 2D:
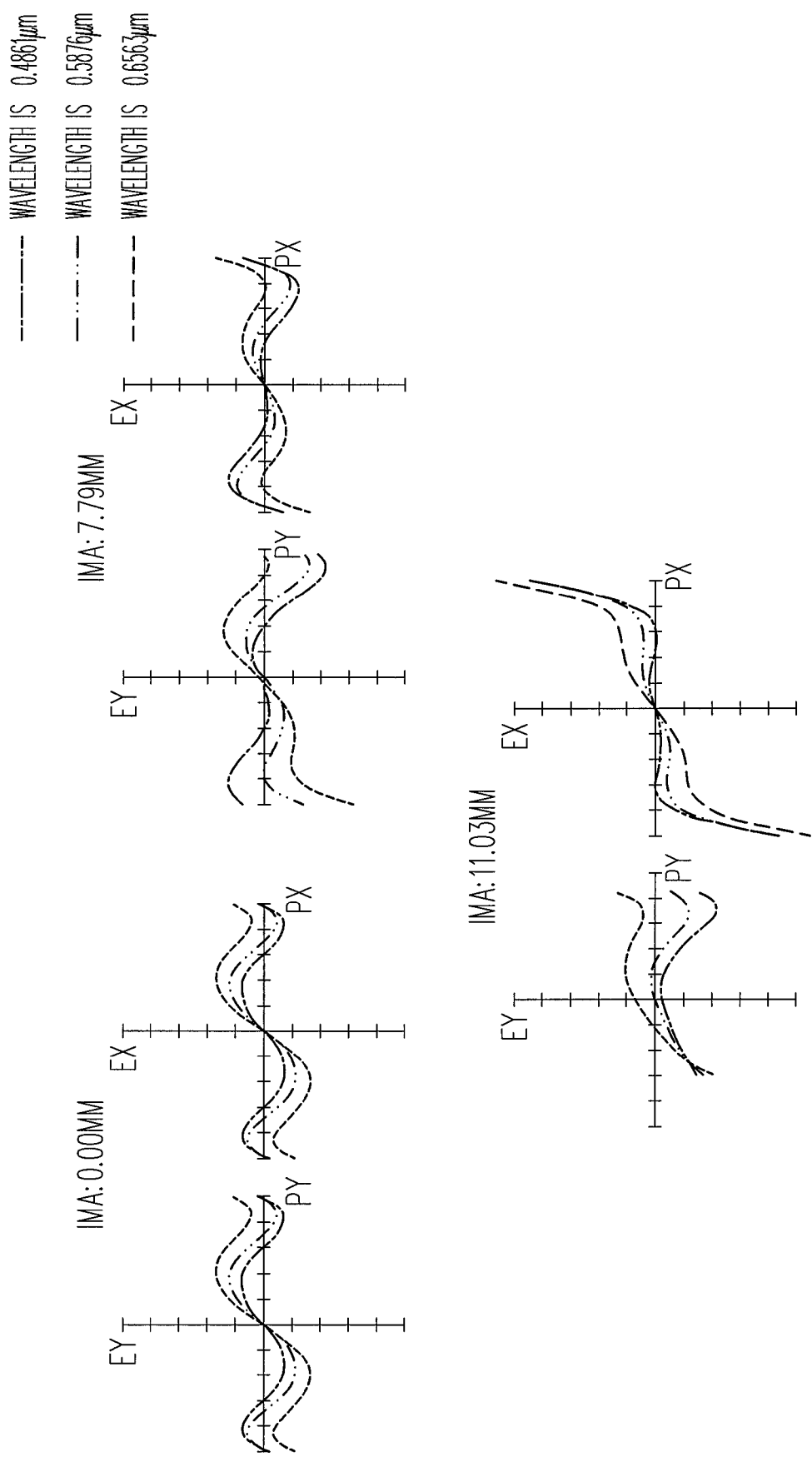

Referring to FIGS. 2A-2D, FIG. 2A is the graph diagram of modulation transfer function (MTF) curve, wherein the abscissa represents spatial frequency (in unit of cycles per mm) and the ordinate represents the modulus of the optical transfer function (OTF). FIG. 2A shows the optical simulation results by using the light with wavelengths of 486.1 nm, 587.6 nm and 656.3 nm. FIG. 2B shows the field curvature (left) and the distortion (right). FIG. 2C is the lateral color plot through the simulation by using the light with wavelengths of 486.1 nm, 587.6 nm and 656.3 nm. FIG. 2D is the transverse ray fan plot through the simulation by using the light with wavelengths of 486.1 nm, 587.6 nm and 656.3 nm. All of the results shown by FIGS. 2A-2D are within the required standards, which proves the fixed-focus lens 100 of the embodiment have good optical imaging quality and a wider FOV.

The Second Embodiment

Figure 3:
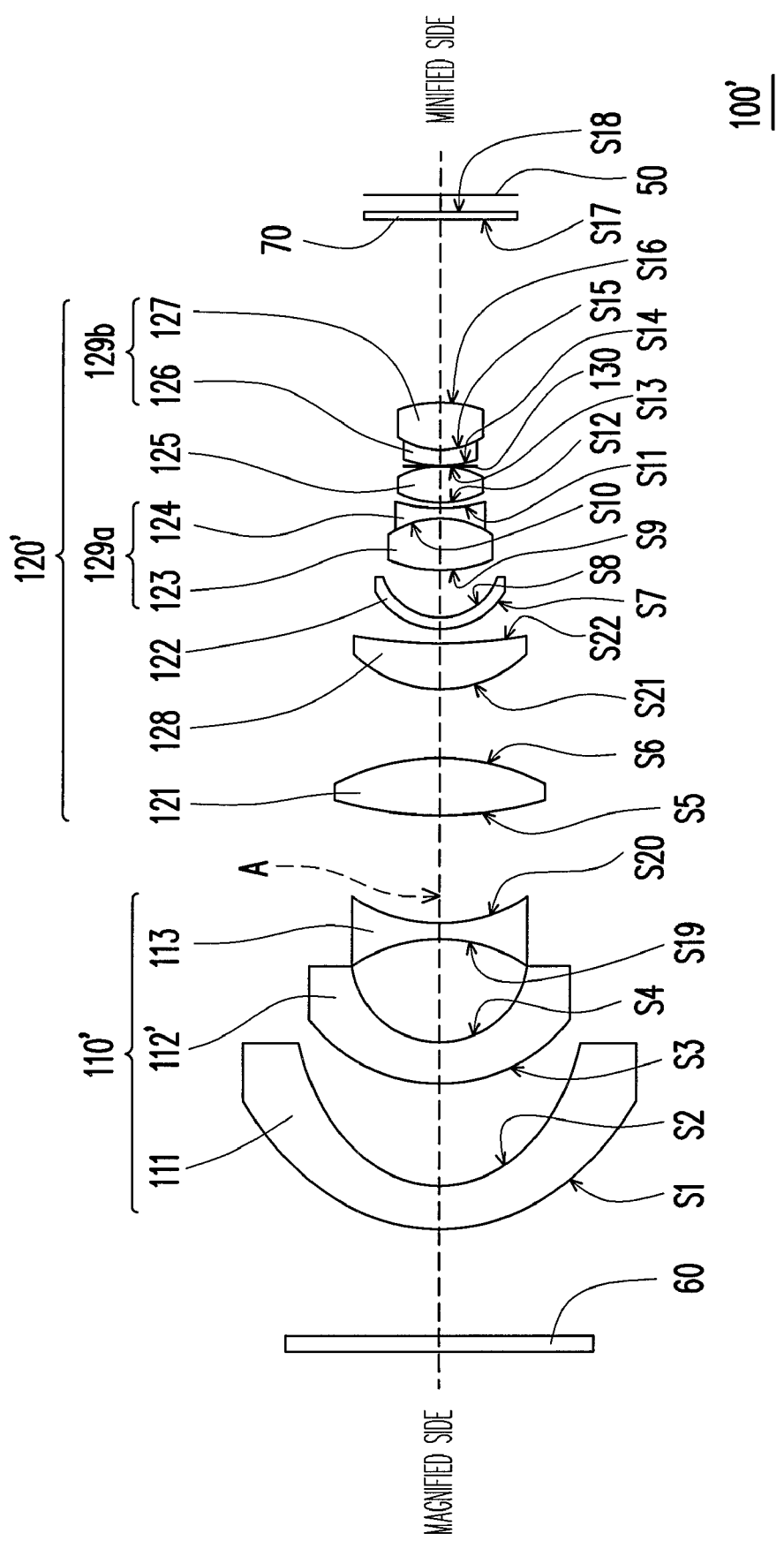
FIG. 3 is a structure diagram of a fixed-focus lens according to the second embodiment of the invention.

Referring to FIG. 3, the fixed-focus lens 100' of the embodiment is similar to the fixed-focus lens 100 in the first embodiment (as shown by FIG. 1), and the differences between them are as follows. In this embodiment, the first lens group 110' of the fixed-focus lens 100' further includes a tenth lens 113 disposed between the second lens 112' and the third lens 121. The second lens group 120' further includes an eleventh lens 128 disposed between the third lens 121 and the fourth lens 122. The refractive powers of the tenth lens 113 and the eleventh lens 128 are, for example, respectively negative and positive, and the tenth lens 113 and the eleventh lens 128 are both spherical lenses. In the embodiment, the relative position between the third lens 121 and the eleventh lens 128 is unchanged, and the third lens 121 and the eleventh lens 128 are capable of moving relatively to the fixed-focus lens 100' for focusing. In the embodiment, the second lens 112' is, for example, a convex-concave lens with a convex surface facing the magnified side. The tenth lens 113 is, for example, a double-concave lens. The eleventh lens 128 is, for example, a concave-convex lens with a convex surface facing the magnified side.

The fixed-focus lens 100' of the embodiment has the same advantage and effect as those of the above-mentioned fixed-focus lens 100 (as shown by FIG. 1). In particular, the fixed-focus lens 100' accomplishes focusing through an interconnected motion of the third lens 121 and the eleventh lens 128, so that the linkage mechanism between the third lens 121 and the eleventh lens 128 for the focusing employs less parts and more simple, which further saves the cost of the fixed-focus lens 100'.

In the following Tables 4, 5 and 6 in association with FIG. 3, the design data of a fixed-focus lens 100' of the embodiment are listed. The invention is not limited to the embodiment

TABLE 4

| surface | curvature radius (mm) | interval (mm) | refractive index | Abbe number | Note |
|---|---|---|---|---|---|
| S1 | 42.47 | 5.16 | 1.49 | 57.4 | first lens |
| S2 | 17.39 | 11.25 | | | |
| S3 | 38.46 | 3.32 | 1.88 | 36.1 | second lens |
| S4 | 17.84 | 13.43 | | | |
| S19 | −26.02 | 1.8 | 1.76 | 41.4 | tenth lens |
| S20 | 34.39 | variable | | | |
| S5 | 105.55 | 9.59 | 1.82 | 45 | third lens |
| S6 | −35.71 | 0.2 | | | |
| S21 | 46.75 | 5.65 | 1.88 | 41 | eleventh lens |
| S22 | 1725.69 | variable | | | |
| S7 | 16.02 | 1.2 | 1.67 | 57.3 | fourth lens |
| S8 | 11.17 | 1.94 | | | |
| S9 | 16.62 | 6.67 | 1.58 | 44.6 | fifth lens |
| S10 | −12.92 | 1.2 | 1.84 | 37.1 | sixth lens |
| S11 | 21.79 | 1.84 | | | |
| S12 | 19.02 | 4.02 | 1.61 | 63.1 | seventh lens |
| S13 | −20.52 | 0.56 | | | |
| S14 | 54.51 | 1.2 | 1.88 | 40.8 | eighth lens |
| S15 | 10.79 | 6.5 | 1.5 | 81.4 | ninth lens |
| S16 | −20.94 | 21.64 | | | |
| S17 | infinity | 1.05 | 1.51 | 63.1 | cover glass |
| S18 | infinity | 1.11 | | | |

TABLE 5

| surface | projection distance (mm) | interval (mm) |
|---|---|---|
| SS20 | 500 | 6.86 |
| | 5000 | 6.75 |
| SS22 | 500 | 13.81 |
| | 5000 | 13.92 |

In Table 4, the surfaces S1, S2 and S5-S18 are the same as the surfaces S1, S2 and S5-S18 in Table 1. The surfaces S3 and S4 are the both surfaces of the second lens 112', the surfaces S19 and S20 are the both surfaces of the tenth lens 113, and the surfaces S21 and S22 are the both surfaces of the eleventh lens 128.

In Table 5, when the corresponding projection distance is 500 mm, the interval between the surface S20 and the surface S5 is 6.86 mm and the interval between the surface S22 and the surface S7 is 13.81 mm. When the corresponding projection distance is 5000 mm, the interval between the surface S20 and the surface S5 is 6.72 mm and the interval between the surface S22 and the surface S7 is 13.92 mm.

The above-mentioned surfaces S1 and S2 are even power term aspheric surfaces, and the aspheric parameter values of the surfaces S1 and S2 are listed in Table 6. The coefficient $A_2$ is zero in the embodiment.

TABLE 6

| aspheric parameters | conic-surface coefficient k | coefficient $A_4$ | coefficient $A_6$ | coefficient $A_8$ |
|---|---|---|---|---|
| S1 | −1.339241846 | 8.5568E−06 | −1.13871E−08 | 1.08773E−11 |
| S2 | −8.9042149E−01 | 1.82162E−05 | −9.15209E−09 | −3.33367E−11 |

| aspheric parameters | coefficient $A_{10}$ | coefficient $A_{12}$ | Coefficient $A_{14}$ |
|---|---|---|---|
| S1 | −6.38718E−15 | 3.91648E−18 | −1.28742E−21 |
| S2 | −5.61332E−14 | 3.37434E−18 | 8.33465E−20 |

The Third Embodiment

Figure 4:
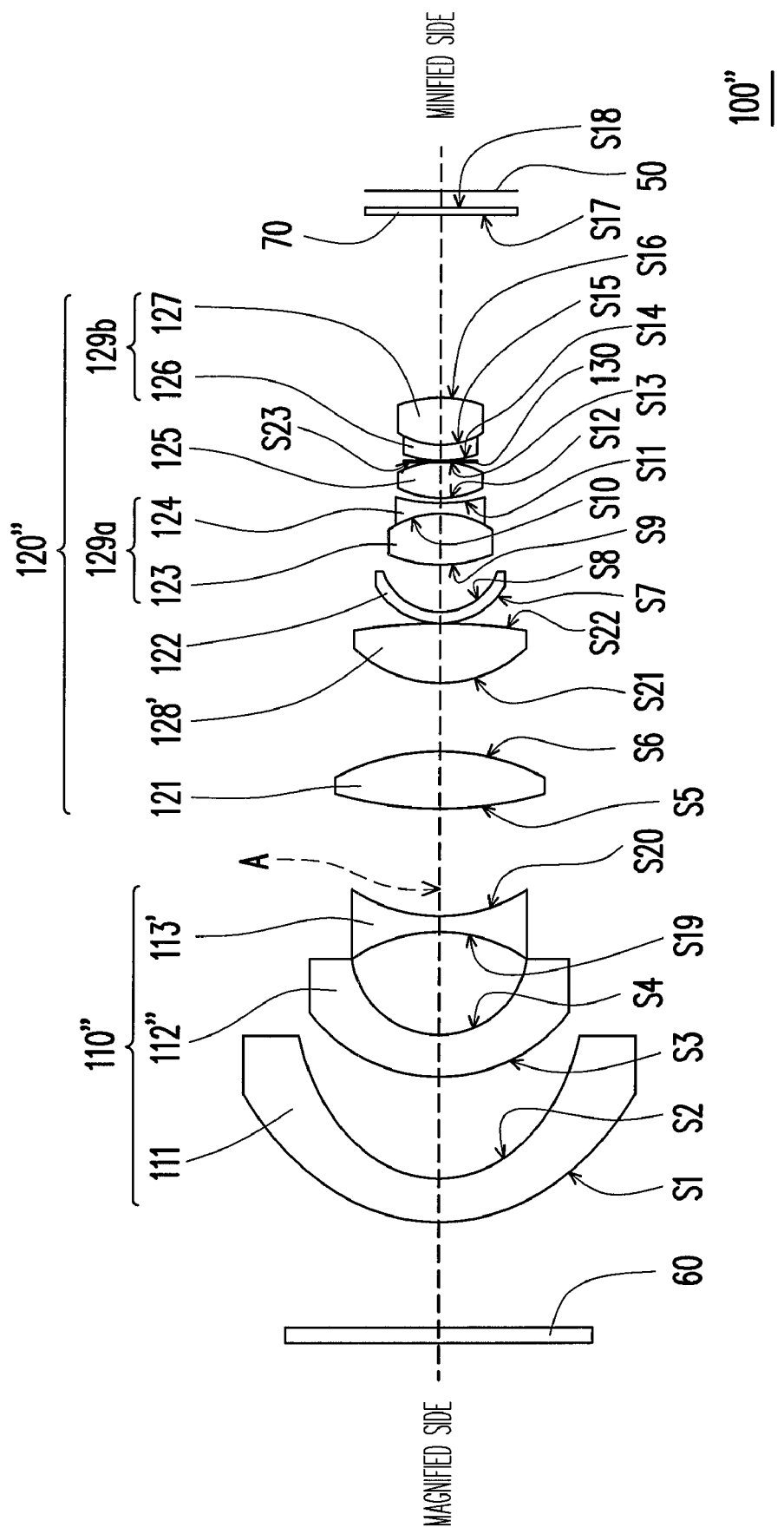
FIG. 4 is a structure diagram of a fixed-focus lens according to the third embodiment of the invention.

Referring to FIG. 4, the fixed-focus lens 100" of the embodiment is similar to the fixed-focus lens 100 in the first embodiment (as shown by FIG. 1), and the differences between them are as follows. In this embodiment, the first lens group 110" of the fixed-focus lens 100" further includes a tenth lens 113' disposed between the second lens 112" and the third lens 121. The second lens group 120" further includes an eleventh lens 128' disposed between the third lens 121 and the fourth lens 122. The refractive powers of the tenth lens 113' and the eleventh lens 128' are, for example, respectively negative and positive, and the tenth lens 113' and the eleventh lens 128' are both spherical lenses. In this embodiment, the positions of the first lens group 110", the fifth lens 123, the sixth lens 124, the seventh lens 125, the eighth lens 126 and the ninth lens 127 relative to the fixed-focus lens 100" remain unchanged, the relative positions between the third lens 121, the eleventh lens 128' and the fourth lens 122 remains unchanged, and the third lens 121, the eleventh lens 128' and the fourth lens 122 are capable of moving relatively to the fixed-focus lens 100" for focusing. In other words, in the fixed-focus lens 100", to accomplish focusing, a linkage motion for the three adjacent lenses 121 (third lens), 128' (eleventh lens) and 122 (fourth lens) is required, and the linkage motion may be achieved by simpler mechanism. The second lens 112" of the embodiment is, for example, a convex-concave lens with a convex surface facing the magnified side. The tenth lens 113' is, for example, a double-concave lens. The eleventh lens 128' is, for example, a double-convex lens.

In the following Tables 7, 8 and 9 in association with FIG. 4, the design data of a fixed-focus lens 100" of the embodiment are listed. The invention is not limited to the embodiment.

TABLE 7

| surface | curvature radius (mm) | interval (mm) | refractive index | Abbe number | Note |
|---|---|---|---|---|---|
| S1 | 35.52 | 4 | 1.49 | 57.4 | first lens |
| S2 | 15.99 | 18.17 | | | |
| S3 | 41.31 | 4.49 | 1.66 | 33 | second lens |
| S4 | 15.9 | 12.27 | | | |
| S19 | −21.99 | 1.2 | 1.76 | 41.4 | tenth lens |
| S20 | 37.36 | variable | | | |
| S5 | 93.82 | 8.14 | 1.81 | 39.5 | third lens |
| S6 | −31.07 | 2.22 | | | |
| S21 | 44.53 | 5.75 | 1.84 | 32.5 | eleventh lens |
| S22 | −158.45 | 6.31 | | | |
| S7 | 15.86 | 1.2 | 1.82 | 38.6 | fourth lens |
| S8 | 12.02 | variable | | | |
| S9 | 18.72 | 7.42 | 1.57 | 45.6 | fifth lens |
| S10 | −13.32 | 1.41 | 1.84 | 32.5 | sixth lens |
| S11 | 21.08 | 1.79 | | | |
| S12 | 20.95 | 4.85 | 1.59 | 46.4 | seventh lens |
| S13 | −18.46 | 0.2 | | | |
| S23 | infinity | 0.2 | | | aperture stop |
| S14 | 49.31 | 1.29 | 1.83 | 37 | eighth lens |
| S15 | 11.2 | 6.5 | 1.51 | 78.6 | ninth lens |
| S16 | −27.07 | 21.63 | | | |
| S17 | infinity | 1.05 | 1.51 | 63.1 | cover glass |
| S18 | infinity | 1.11 | | | |

TABLE 8

| surface | projection distance (mm) | interval (mm) |
|---|---|---|
| S20 | 500 | 3.83 |
| | 5000 | 3.75 |
| S8 | 500 | 2.08 |
| | 5000 | 2.16 |

In Table 7, the surfaces S1, S2 and S5-S18 are the same as the surfaces S1, S2 and S5-S18 in Table 1. The surfaces S3 and S4 are the both surfaces of the second lens 112", the surfaces S19 and S20 are the both surfaces of the tenth lens 113', the surfaces S21 and S22 are the both surfaces of the eleventh lens 128', and the surface S23 is the surface of the aperture stop 130.

In Table 8, when the corresponding projection distance is 500 mm, the interval between the surface S20 and the surface S5 is 3.83 mm, and the interval between the surface S8 and the surface S9 is 2.08 mm. When the corresponding projection distance is 5000 mm, the interval between the surface S20 and the surface S5 is 3.75 mm, and the interval between the surface S8 and the surface S9 is 2.16 mm.

The above-mentioned surfaces S1 and S2 are even power term aspheric surfaces, and the aspheric parameter values of the surfaces S1 and S2 are listed in Table 9. The coefficient $A_2$ is zero in the embodiment.

TABLE 9

| aspheric parameters | conic-surface coefficient k | coefficient $A_4$ | coefficient $A_6$ | coefficient $A_8$ |
|---|---|---|---|---|
| S1 | −8.85351E−01 | 7.19236E−06 | −1.25855E−08 | 1.13858E−11 |
| S2 | −9.26655E−01 | 2.14053E−05 | 3.77747E−09 | −1.48029E−11 |

| aspheric parameters | coefficient $A_{10}$ | coefficient $A_{12}$ | coefficient $A_{14}$ |
|---|---|---|---|
| S1 | −6.96566E−15 | 3.76313E−18 | −9.33018E−22 |
| S2 | −4.40975E−14 | −1.19236E−17 | −2.61054E−20 |

The Fourth Embodiment

Figure 5:
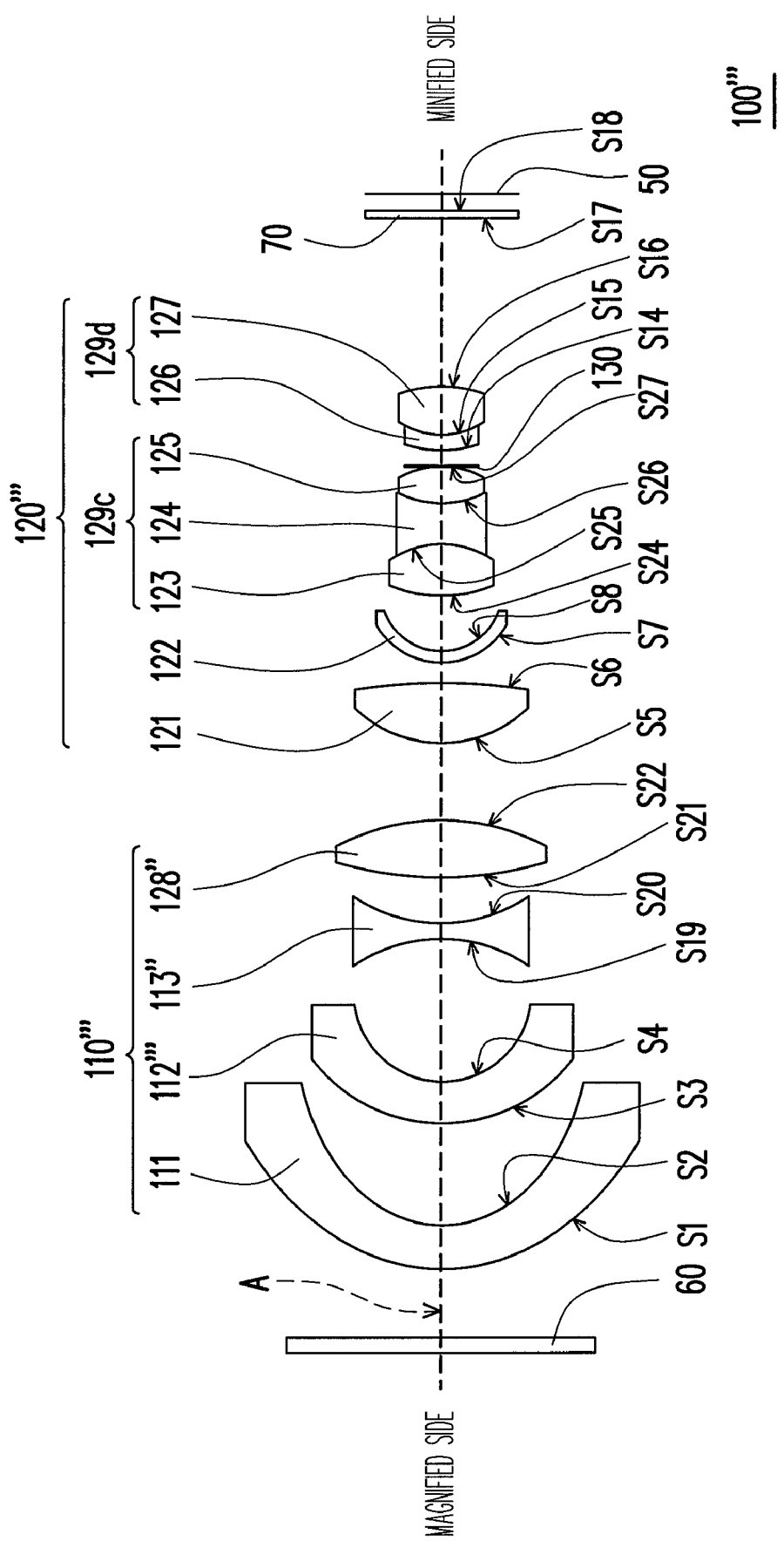
FIG. 5 is a structure diagram of a fixed-focus lens according to the fourth embodiment of the invention.

Referring to FIG. 5, the fixed-focus lens 100''' of the embodiment is similar to the fixed-focus lens 100 in the first embodiment (as shown by FIG. 1), and the differences between them are as follows. In this embodiment, the first lens group 110''' of the fixed-focus lens 100''' further includes a tenth lens 113'' and an eleventh lens 128'', wherein the tenth lens 113'' is disposed between the second lens 112''' and the third lens 121, and the eleventh lens 128'' is disposed between the tenth lens 113'' and the third lens 121. The refractive powers of the tenth lens 113'' and the eleventh lens 128'' are, for example, respectively negative and positive, and the tenth lens 113'' and the eleventh lens 128'' are both spherical lenses. The positions of the first lens group 110''', the fourth lens 122, the fifth lens 123, the sixth lens 124, the seventh lens 125, the eighth lens 126 and the ninth lens 127 relative to the fixed-focus lens 100''' remain unchanged, and the third lens 121 is capable of moving relatively to the fixed-focus lens 100''' for focusing. In addition, in this embodiment, the fifth lens 123, the sixth lens 124 and the seventh lens 125 in the second lens group 120''' together form a triple cemented lens 129c, and the eighth lens 126 and the ninth lens 127 together form a double cemented lens 129d. The second lens 112''' of the embodiment is, for example, a convex-concave lens with a convex surface facing the magnified side. The tenth lens 113'' is, for example, a double-concave lens. The eleventh lens 128'' is, for example, a double-convex lens.

In the following Tables 10, 11 and 12 in association with FIG. 5, the design data of a fixed-focus lens 100''' of the embodiment are listed. The invention is not limited to the embodiment.

TABLE 10

| surface | curvature radius (mm) | interval (mm) | refractive index | Abbe number | Note |
|---|---|---|---|---|---|
| S1 | 32.73 | 4 | 1.49 | 57.4 | first lens |
| S2 | 14.39 | 10.91 | | | |
| S3 | 37.87 | 2.27 | 1.81 | 39.8 | second lens |
| S4 | 18.64 | 14.49 | | | |
| S19 | −37.79 | 6 | 1.81 | 39.8 | tenth lens |
| S20 | 25.86 | 5.12 | | | |
| S21 | 164.1 | 6 | 1.62 | 37.7 | eleventh lens |
| S22 | −38.11 | variable | | | |
| S5 | 37.65 | 7.1 | 1.82 | 31.9 | third lens |
| S6 | −79.14 | variable | | | |
| S7 | 13.47 | 1.69 | 1.54 | 54.4 | fourth lens |
| S8 | 10.32 | 3.95 | | | |
| S24 | 27.44 | 6.42 | 1.53 | 71.9 | fifth lens |
| S25 | −12.74 | 5.73 | 1.79 | 32.6 | sixth lens |
| S26 | 3219.38 | 3.43 | 1.53 | 58.5 | seventh lens |
| S27 | −18 | 2.64 | | | |
| S14 | 50.32 | 2.2 | 1.83 | 35.3 | eighth lens |
| S15 | 10.98 | 4.45 | 1.5 | 79.6 | ninth lens |
| S16 | −20.06 | 16.2 | | | |

TABLE 10-continued

| surface | curvature radius (mm) | interval (mm) | refractive index | Abbe number | Note |
|---|---|---|---|---|---|
| S17 | infinity | 1.05 | 1.51 | 63.1 | cover glass |
| S18 | infinity | 1.11 | | | |

TABLE 11

| surface | projection distance (mm) | interval (mm) |
|---|---|---|
| S22 | 500 | 7.51 |
| | 5000 | 7.09 |
| S6 | 500 | 3.19 |
| | 5000 | 3.62 |

In Table 10, the surfaces S1, S2, S5-S8 and S14-S18 are the same as the surfaces S1, S2, S5-S8 and S14-S18 in Table 1. The surfaces S3 and S4 are the both surfaces of the second lens 112'''; the surfaces S19 and S20 are the both surfaces of the tenth lens 113'', and the surfaces S21 and S22 are the both surfaces of the eleventh lens 128''. In addition, the surface S24 is the surface of the fifth lens 123 facing the magnified side, the surface S25 is the surface joining the fifth lens 123 and the sixth lens 124, the surface S26 is the surface joining the sixth lens 124 and the seventh lens 125, the surface S27 is the surface facing the reduced side of the seventh lens 125.

In Table 11, when the corresponding projection distance is 500 mm, the interval between the surface S22 and the surface S5 is 7.51 mm, and the interval between the surface S6 and the surface S7 is 3.19 mm. When the corresponding projection distance is 5000 mm, the interval between the surface S22 and the surface S5 is 7.09 mm, and the interval between the surface S6 and the surface S7 is 3.62 mm.

The above-mentioned surfaces S1 and S2 are even power term aspheric surfaces, and the aspheric parameter values of the surfaces S1 and S2 are listed in Table 12. The coefficient $A_2$ is zero in the embodiment.

TABLE 12

| aspheric parameters | conic-surface coefficient k | coefficient $A_4$ | coefficient $A_6$ | coefficient $A_8$ |
|---|---|---|---|---|
| S1 | −9.51977609E−01 | 4.46142E−06 | −1.32631E−08 | 2.01462E−11 |
| S2 | −8.81522643E−01 | 1.79899E−05 | −1.0814E−08 | −5.55007E−11 |

| aspheric parameters | coefficient $A_{10}$ | coefficient $A_{12}$ | coefficient $A_{14}$ |
|---|---|---|---|
| S1 | −1.34916E−14 | 3.4028E−18 | 1.18242E−21 |
| S2 | −4.92213E−14 | 1.8471E−18 | 1.11879E−19 |

The Fifth Embodiment

Figure 6:
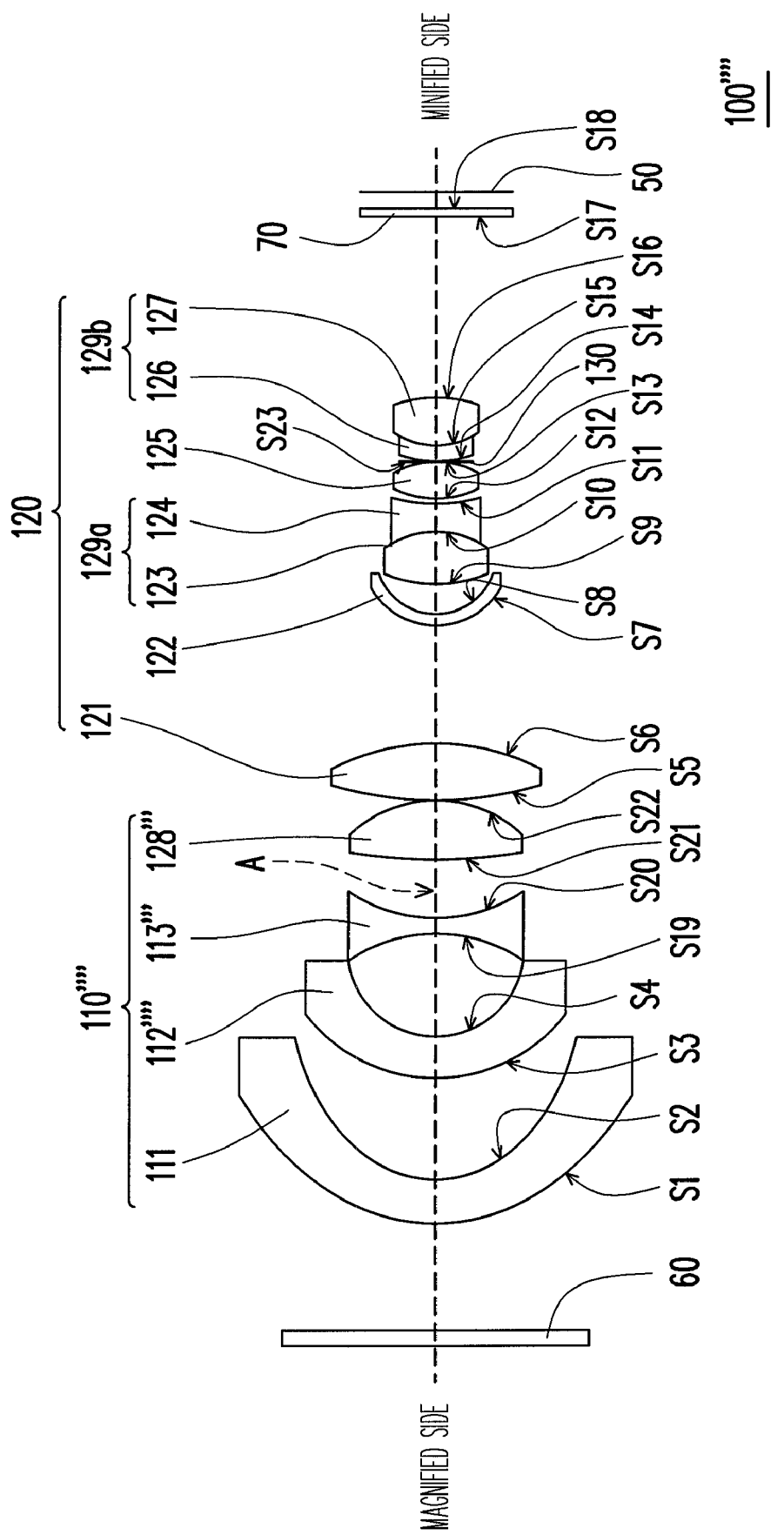
FIG. 6 is a structure diagram of a fixed-focus lens according to the fifth embodiment of the invention.

Referring to FIG. 6, the fixed-focus lens 100"" of the embodiment is similar to the fixed-focus lens 100 in the first embodiment (as shown by FIG. 1), and the differences between them are as follows. In this embodiment, the first lens group 110"" of the fixed-focus lens 100"" further includes a tenth lens 113''' and an eleventh lens 128''', wherein the tenth lens 113''' is disposed between the second lens 112"" and the third lens 121, and the eleventh lens 128''' is disposed between the tenth lens 113''' and the third lens 121. The refractive powers of the tenth lens 113''' and the eleventh lens 128''' are, for example, respectively negative and positive, and the tenth lens 113''' and the eleventh lens 128''' are both spherical lenses. The positions of the first lens group 110"", the fifth lens 123, the sixth lens 124, the seventh lens 125, the eighth lens 126 and the ninth lens 127 relative to the fixed-focus lens 100"" remain unchanged, and the relative position between the third lens 121 and the fourth lens 122 is unchanged. The third lens 121 and the fourth lens 122 are capable of moving relatively to the fixed-focus lens 100"" for focusing. In an embodiment of the invention, the second lens 112"" is, for example, a convex-concave lens with a convex surface facing the magnified side. The tenth lens 113''' is, for example, a double-concave lens. The eleventh lens 128''' is, for example, a double-convex lens.

In the following Tables 13, 14 and 15 in association with FIG. 6, the design data of a fixed-focus lens 100"" of the embodiment are listed. The invention is not limited to the embodiment.

TABLE 13

| surface | curvature radius (mm) | interval (mm) | refractive index | Abbe number | note |
|---|---|---|---|---|---|
| S1 | 48.68 | 4 | 1.49 | 57.4 | first lens |
| S2 | 17.55 | 20.16 | | | |
| S3 | 42.25 | 1.2 | 1.85 | 23.8 | second lens |
| S4 | 16.58 | 11.83 | | | |
| S19 | −22.24 | 1.2 | 1.76 | 41.4 | tenth lens |
| S20 | 37 | 3.7 | | | |
| S21 | 93.82 | 7.79 | 1.82 | 38.1 | eleventh lens |
| S22 | −35.93 | variable | | | |
| S5 | 59.14 | 6.82 | 1.84 | 27.3 | third lens |
| S6 | −72.3 | 11.21 | | | |

TABLE 13-continued

| surface | curvature radius (mm) | interval (mm) | refractive index | Abbe number | note |
|---|---|---|---|---|---|
| S7 | 14.56 | 1.2 | 1.78 | 42.6 | fourth lens |
| S8 | 11.7 | variable | | | |
| S9 | 18.63 | 6.53 | 1.58 | 44.8 | fifth lens |
| S10 | −13.61 | 3.6 | 1.84 | 28.2 | sixth lens |
| S11 | 21.17 | 1.17 | | | |
| S12 | 18.98 | 3.96 | 1.59 | 42.8 | seventh lens |
| S13 | −19.59 | 0.2 | | | |
| S23 | infinity | 0.2 | | | aperture stop |
| S14 | 45.45 | 1.2 | 1.83 | 37.6 | eighth lens |
| S15 | 10.56 | 6.31 | 1.51 | 71.2 | ninth lens |
| S16 | −27.8 | 21.1 | | | |
| S17 | infinity | 1.05 | 1.51 | 63.1 | cover glass |
| S18 | infinity | 1.11 | | | |

TABLE 14

| surface | projection distance (mm) | interval (mm) |
|---|---|---|
| S22 | 500 | 0.58 |
| | 5000 | 0.2 |
| S8 | 500 | 1.86 |
| | 5000 | 2.24 |

In Table 13, the surfaces S1, S2 and S5-S18 are the same as the surfaces S1, S2 and S5-S18 in Table 1. The surfaces S3 and S4 are the both surfaces of the second lens 112"", the surfaces S19 and S20 are the both surfaces of the tenth lens 113''', and the surfaces S21 and S22 are the both surfaces of the eleventh lens 128'''. The surface S23 is the surface of the aperture stop 130.

In Table 14, when the corresponding projection distance is 500 mm, the interval between the surface S22 and the surface S5 is 0.58 mm and the interval between the surface S8 and the surface S9 is 1.86 mm. When the corresponding projection distance is 5000 mm, the interval between the surface S22 and the surface S5 is 0.20 mm, and the interval between the surface S8 and the surface S9 is 2.24 mm.

The above-mentioned surfaces S1 and S2 are even power term aspheric surfaces, and the aspheric parameter values of the surfaces S1 and S2 are listed in Table 15. The coefficient $A_2$ is zero in the embodiment.

TABLE 15

| aspheric parameters | conic-surface coefficient k | coefficient $A_4$ | coefficient $A_6$ | coefficient $A_8$ |
|---|---|---|---|---|
| S1 | −3.74862198E−01 | 7.60985E−06 | −1.11784E−08 | 1.10848E−11 |
| S2 | −9.66300161E−01 | 1.93588E−05 | 9.81349E−09 | −1.55247E−11 |

TABLE 15-continued

| aspheric parameters | coefficient $A_{10}$ | coefficient $A_{12}$ | coefficient $A_{14}$ |
|---|---|---|---|
| S1 | −7.49572E−15 | 3.67582E−18 | −6.68238E−22 |
| S2 | −4.41826E−14 | −5.87535E−18 | −8.45248E−21 |

In summary, in the fixed-focus lens of the embodiments of the invention, the distortion, the astigmatism and the field curvature of optical imaging may be reduced through a combinational disposition of the aspheric lens and the spherical lens in the first lens group. Meanwhile, the spherical aberration and the coma may be reduced by alternately arranging at least a part of the spherical lenses in the second lens group so as to make the positive refractive powers and the negative refractive powers thereof alternately arranged. In this way, the fixed-focus lens of the embodiment of the invention is able to produce good optical imaging quality. Further, since the fixed-focus lens of the embodiments of the invention employs a less number of aspheric lenses (for example, usually a piece only), so that the fixed-focus lens is advantageous in having good imaging quality, saving the cost of the optical components and reducing the fabrication difficulty of the lenses.

Besides, the fixed-focus lens of the embodiments of the invention employs less lenses, such that the volume of the fixed-focus lens is reduced. In addition, since the fixed-focus lens is designed under the condition of F/H>0.627, so that a wider FOV is achieved without degrading the imaging quality. Moreover, for the fixed-focus lens of the embodiments of the invention to accomplish focusing, only a group of lenses in linkage is required, wherein the group of lenses includes at least a lens. In the embodiment, the fixed-focus lens of the invention merely requires a simple mechanism with less parts to accomplish the focusing, which reduces the cost of the fixed-focus lens.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention.

It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed-focus lens, comprising:
a first lens group, disposed between a magnified side and a reduced side and comprising a first lens and a second lens arranged in sequence from the magnified side to the reduced side, wherein the refractive powers of both the first lens and the second lens are negative, and the first lens is an aspheric lens; and
a second lens group, disposed between the first lens group and the reduced side and comprising a third lens, a fourth lens, a fifth lens, a sixth lens, a seventh lens, an eighth lens, and a ninth lens arranged in sequence from the magnified side to the reduced side, wherein the refractive powers of the third lens, the fourth lens, the fifth lens, the sixth lens, the seventh lens, the eighth lens, and the ninth lens are respectively positive, negative, positive, negative, positive, negative, and positive in sequence, the effective focal length of the fixed-focus lens is F, the image height at the reduced side is H, and F/H>0.627.

2. The fixed-focus lens as claimed in claim 1, wherein the effective focal length of the first lens group is F1, the effective focal length of the second lens group is F2, and the fixed-focus lens satisfies 0.5<|F1/F|<1.7 and 1.9<|F2/F|<3.1.

3. The fixed-focus lens as claimed in claim 1, wherein the positions of the first lens group, the fourth lens, the fifth lens, the sixth lens, the seventh lens, the eighth lens, and the ninth lens relative to the fixed-focus lens remain unchanged and the third lens is capable of moving relatively to the fixed-focus lens for focusing.

4. The fixed-focus lens as claimed in claim 1, wherein the fifth lens and the sixth lens together form a first double cemented lens, and the eighth lens and the ninth lens together form a second double cemented lens.

5. The fixed-focus lens as claimed in claim 1, further comprising an aperture stop disposed between the seventh lens and the eighth lens.

6. The fixed-focus lens as claimed in claim 1, wherein the first lens is a convex-concave lens with a convex surface facing the magnified side, the second lens is a plane-concave lens with a plane surface facing the magnified side, the third lens is a double-convex lens, the fourth lens is a convex-concave lens with a convex surface facing the magnified side, the fifth lens is a double-convex lens, the sixth lens is a double-concave lens, the seventh lens is a double-convex lens, the eighth lens is a convex-concave lens with a convex surface facing the magnified side, and the ninth lens is a double-convex lens.

7. The fixed-focus lens as claimed in claim 1, wherein the first lens group further comprises a tenth lens disposed between the second lens and the third lens, the second lens group further comprises an eleventh lens disposed between the third lens and the fourth lens, and the refractive powers of the tenth lens and the eleventh lens are respectively negative and positive.

8. The fixed-focus lens as claimed in claim 7, wherein the fifth lens and the sixth lens together form a first double cemented lens, and the eighth lens and the ninth lens together form a second double cemented lens.

9. The fixed-focus lens as claimed in claim 7, wherein the positions of the first lens group, the fourth lens, the fifth lens, the sixth lens, the seventh lens, the eighth lens, and the ninth lens relative to the fixed-focus lens remain unchanged, the relative position between the third lens and the eleventh lens remains unchanged, and the third lens and the eleventh lens are capable of moving relatively to the fixed-focus lens for focusing.

10. The fixed-focus lens as claimed in claim 7, wherein the positions of the first lens group, the fifth lens, the sixth lens, the seventh lens, the eighth lens, and the ninth lens relative to the fixed-focus lens remain unchanged, the relative positions between the third lens, the eleventh lens, and the fourth lens remain unchanged, and the third lens, the eleventh lens and the fourth lens are capable of moving relatively to the fixed-focus lens for focusing.

11. The fixed-focus lens as claimed in claim 7, wherein the first lens is a convex-concave lens with a convex surface facing the magnified side, the second lens is a convex-concave lens with a convex surface facing the magnified side, the tenth lens is a double-concave lens, the third lens is a double-convex lens, the eleventh lens is a concave-convex lens with a convex surface facing the magnified side, the fourth lens is a convex-concave lens with a convex surface facing the magnified side, the fifth lens is a double-convex lens, the sixth lens is a double-concave lens, the seventh lens is a double-convex lens, the eighth lens is a convex-concave lens with a convex surface facing the magnified side, and the ninth lens is a double-convex lens.

12. The fixed-focus lens as claimed in claim 7, wherein the first lens is a convex-concave lens with a convex surface facing the magnified side, the second lens is a convex-concave lens with a convex surface facing the magnified side, the tenth lens is a double-concave lens, the third lens is a double-convex lens, the eleventh lens is a double-convex lens, the fourth lens is a convex-concave lens with a convex surface facing the magnified side, the fifth lens is a double-convex lens, the sixth lens is a double-concave lens, the seventh lens is a double-convex lens, the eighth lens is a convex-concave lens with a convex surface facing the magnified side, and the ninth lens is a double-convex lens.

13. The fixed-focus lens as claimed in claim 1, wherein the first lens group further comprises a tenth lens and an eleventh lens, the tenth lens is disposed between the second lens and the third lens, the eleventh lens is disposed between the tenth lens and the third lens, and the refractive powers of the tenth lens and the eleventh lens are respectively negative and positive.

14. The fixed-focus lens as claimed in claim 13, wherein the positions of the first lens group, the fourth lens, the fifth lens, the sixth lens, the seventh lens, the eighth lens, and the ninth lens relative to the fixed-focus lens remain unchanged, the third lens is capable of moving relatively to the fixed-focus lens for focusing.

15. The fixed-focus lens as claimed in claim 13, wherein the positions of the first lens group, the fifth lens, the sixth lens, the seventh lens, the eighth lens, and the ninth lens relative to the fixed-focus lens remain unchanged, the relative position between the third lens and the fourth lens remains unchanged, and the third lens and the fourth lens are capable of moving relatively to the fixed-focus lens for focusing.

16. The fixed-focus lens as claimed in claim 13, wherein the fifth lens, the sixth lens, and the seventh lens together form a triple cemented lens, and the eighth lens and the ninth lens together form a double cemented lens.

17. The fixed-focus lens as claimed in claim 13, wherein the fifth lens and the sixth lens together form a first double cemented lens, and the eighth lens and the ninth lens together form a second double cemented lens.

18. The fixed-focus lens as claimed in claim 13, wherein the first lens is a convex-concave lens with a convex surface facing the magnified side, the second lens is a convex-concave lens with a convex surface facing the magnified side, the tenth lens is a double-concave lens, the eleventh lens is a double-convex lens, the third lens is a double-convex lens, the fourth lens is a convex-concave lens with a convex surface facing the magnified side, the fifth lens is a double-convex lens, the sixth lens is a double-concave lens, the seventh lens is a double-convex lens, the eighth lens is a convex-concave lens with a convex surface facing the magnified side, and the ninth lens is a double-convex lens.

19. The fixed-focus lens as claimed in claim 1, wherein each of the second lens, the third lens, the fourth lens, the fifth lens, the sixth lens, the seventh lens, the eighth lens, and the ninth lens is a spherical lens.

* * * * *